(12) United States Patent
Kimura et al.

(10) Patent No.: US 9,751,143 B2
(45) Date of Patent: Sep. 5, 2017

(54) ALUMINUM ALLOY BRAZING SHEET FOR HEAT EXCHANGER

(71) Applicants: KOBE STEEL, LTD., Kobe-shi (JP); DENSO CORPORATION, Kariya-shi (JP)

(72) Inventors: Shimpei Kimura, Moka (JP); Toshiki Ueda, Moka (JP); Takahiro Izumi, Moka (JP); Haruyuki Konishi, Kobe (JP); Hayaki Teramoto, Owariasahi (JP); Osamu Hakamata, Toyohashi (JP); Michiyasu Yamamoto, Chiryu (JP)

(73) Assignees: KOBE STEEL, LTD., Kobe-shi (JP); DENSO CORPORATION, Kariya-shi (JP)

( * ) Notice: Subject to any disclaimer, the term of this patent is extended or adjusted under 35 U.S.C. 154(b) by 0 days.

(21) Appl. No.: 13/795,550

(22) Filed: Mar. 12, 2013

(65) Prior Publication Data

US 2013/0260175 A1 Oct. 3, 2013

(30) Foreign Application Priority Data

Mar. 30, 2012 (JP) ................................. 2012-082790

(51) Int. Cl.
*B32B 15/01* (2006.01)
*C22C 21/00* (2006.01)
(Continued)

(52) U.S. Cl.
CPC .......... *B23K 1/0012* (2013.01); *B23K 1/0004* (2013.01); *B23K 35/0238* (2013.01);
(Continued)

(58) Field of Classification Search
CPC .................................................. B32B 15/016
(Continued)

(56) References Cited

U.S. PATENT DOCUMENTS 8,043,711 B2 10/2011 Koshigoe et al.
8,247,082 B2 8/2012 Ueda et al.
(Continued)

FOREIGN PATENT DOCUMENTS

CN 101935782 A 1/2011
CN 102251154 A 11/2011
(Continued)

OTHER PUBLICATIONS

AMAG Rolling, "Brazing materials: competence in Aluminum, Roll clad aluminum products for heat exchanger applications".*
U.S. Appl. No. 13/795,891, filed Mar. 12, 2013, Kimura, et al.

*Primary Examiner* — Humera Sheikh
*Assistant Examiner* — Lucas Wang
(74) *Attorney, Agent, or Firm* — Oblon, McClelland, Maier & Neustadt, L.L.P.

(57) ABSTRACT

An aluminum alloy brazing sheet for heat exchangers has a core, a sacrificial material formed on one side of the core, and a brazing filler metal formed on the other side of the core. The core is made of an aluminum alloy containing Si, Cu, Mn, and Al. The sacrificial material is made of an aluminum alloy containing Si, Zn, Mg, and Al. The brazing filler metal is made of an aluminum alloy. The aluminum alloy brazing sheet for heat exchangers has a work hardening exponent n of not less than 0.05. The core has an average crystal grain size of not more than 10 μm in a cross-section. The aluminum alloy brazing sheet for heat exchangers has excellent strength and corrosion resistance even when it is formed into a thin material and also has excellent high frequency weldability and weld cracking resistance during electric resistance welding.

3 Claims, 2 Drawing Sheets

(51) Int. Cl.
  *B21B 3/00*  (2006.01)
  *B23K 1/00*  (2006.01)
  *B23K 35/02*  (2006.01)
(52) U.S. Cl.
  CPC ............ *B32B 15/016* (2013.01); *C22C 21/00* (2013.01); *Y10T 428/12764* (2015.01)
(58) Field of Classification Search
  USPC ........................................................ 428/650
  See application file for complete search history.

(56) References Cited

U.S. PATENT DOCUMENTS

| | | |
|---|---|---|
| 8,247,083 B2 | 8/2012 | Izumi et al. |
| 8,247,084 B2 | 8/2012 | Kimura et al. |
| 8,343,635 B2 | 1/2013 | Matsumoto et al. |
| 2006/0105193 A1* | 5/2006 | Burger et al. .................. 428/654 |
| 2010/0101688 A1 | 4/2010 | Koshigoe et al. |
| 2011/0027610 A1 | 2/2011 | Tatsumi et al. |
| 2011/0236717 A1* | 9/2011 | Ueda et al. .................... 428/654 |
| 2011/0240280 A1 | 10/2011 | Izumi et al. |
| 2011/0287277 A1* | 11/2011 | Kimura et al. ............... 428/555 |
| 2011/0293468 A1* | 12/2011 | Suzuki et al. ................ 420/540 |

FOREIGN PATENT DOCUMENTS

| | | |
|---|---|---|
| JP | 2001-170793 | 6/2001 |
| JP | 2013-194266 | 9/2013 |

\* cited by examiner

ALUMINUM ALLOY BRAZING SHEET FOR HEAT EXCHANGER

CROSS-REFERENCE TO RELATED APPLICATION

This application claims priority from Japanese Patent Application No. 2012-082790, the disclosure of which is incorporated herein by reference in its entirety.

BACKGROUND OF THE INVENTION

Technical Field

The present invention relates to an aluminum alloy brazing sheet for heat exchangers used for an automotive heat exchanger, etc.

Description of the Related Art

Generally, as a tube material in an automotive heat exchanger such as an evaporator or a condenser, an aluminum alloy brazing sheet obtained by cladding a core with a sacrificial material and a brazing filler metal (hereinafter sometimes referred to as a brazing sheet) formed into a tube by electric resistance welding has been used. In such a brazing sheet for use as a tube material, an Al—Mn-based alloy, for example, is used as the core, and an Al—Zn-based alloy, for example, is used as the sacrificial material on the inner side, which in one side of the core, i.e., the side that is constantly in contact with a refrigerant. Further, when formed into a tube, an Al—Si-based alloy is usually used as the brazing filler metal on the outer side, which is the other side of the core.

In recent years, there is a trend toward lighter and smaller automotive heat exchangers. With this trend, the thinning of a tube material, which occupies a large part of the mass of a heat exchanger, has been desired. For the thinning of a tube material, it is necessary to increase strength and corrosion resistance corresponding to the decrease in thickness. In response to such needs, aluminum alloy brazing sheets and clad materials for achieving high strength, high corrosion resistance, etc., have been proposed.

For example, JP-A-2001-170793 discloses a high-strength aluminum alloy clad material for heat exchangers having excellent high frequency weldability and corrosion resistance, characterized in that a core and a sacrificial material are each specified to have a predetermined alloy composition, the matrix of the core has a fiber structure, and the clad material has a tensile strength of 170 to 260 MPa.

SUMMARY OF THE INVENTION

However, the prior technique has the following problems.

As mentioned above, for the thinning of a material, strength and corrosion resistance are increased corresponding to a decrease in thickness, for example. However, thinning causes a problem in that weld defects are increased during the electric resistance welding of a tube material, and further weld cracking occurs. Accordingly, in addition to the improvement of high frequency weldability during electric resistance welding (i.e., high frequency welding properties), the improvement of weld cracking resistance (i.e., high frequency welding properties) is required.

The present invention has been made in view of the above-mentioned problems. An object of the present invention is to provide an aluminum alloy brazing sheet for heat exchangers having excellent strength and corrosion resistance even when it is formed into a thin material and also having excellent high frequency weldability and weld cracking resistance during electric resistance welding (high frequency welding properties).

An aluminum alloy brazing sheet for heat exchangers according to the present invention comprising: a core consisting of an aluminum alloy containing Si: 0.1 to 1.0% by mass, Cu: 0.5 to 1.2% by mass, and Mn: 0.5 to 2.0% by mass, the balance being Al and unavoidable impurities; a sacrificial material provided on one side of the core and made of an aluminum alloy containing Si: more than 0.2% by mass and not more than 0.8% by mass, Zn: more than 2.0% by mass and not more than 5.0% by mass, and Mg: 1.0 to 4.5% by mass with the balance of Al and unavoidable impurities; and a brazing filler metal provided on the other side of the core and made of an aluminum alloy, wherein the aluminum alloy brazing sheet for heat exchangers has a work hardening exponent n of not less than 0.05, and wherein the core has an average crystal grain size of not more than 10 μm in a cross-section perpendicular to a rolling direction.

According to this configuration, the core contains predetermined amounts of Si, Cu, and Mn, whereby strength after brazing and corrosion resistance are improved, while the sacrificial material contains predetermined amounts of Si, Zn, and Mg, whereby strength after brazing and corrosion resistance are improved. In addition, the work hardening exponent n is not less than 0.05, whereby the inclination in the plastic working range is increased, leading to an increase in the critical value of strain at which buckling occurs. As a result, during the formation of a diminishing pipe by fin pass rolls, the occurrence of buckling at the edge portion is suppressed, and high frequency welding properties are improved. Further, the core has an average crystal grain size of not more than 10 μm in a cross-section perpendicular to the rolling direction, whereby the stress concentrated on the grain boundary in response to the deforming stress at a high temperature during electric resistance welding is dispersed. As a result, weld cracking does not occur even in the case of thinning and strengthening.

The core may further contain at least one member selected from Ti: 0.05 to 0.25% by mass, Cr: not more than 0.25% by mass, and Mg: 0.05 to 0.5% by mass.

According to this configuration, the core contains predetermined amounts of Ti, Cr, and Mg, whereby corrosion resistance and strength after brazing are improved.

The aluminum alloy brazing sheet for heat exchangers according to the present invention makes it possible to improve strength and corrosion resistance even in a thin material. Further, high frequency welding properties can also be improved. Accordingly, during the formation of a diminishing pipe by fin pass rolls, the occurrence of buckling at the edge portion can be suppressed, whereby matching during electric resistance welding is stabilized, and also the occurrence of weld cracking can be suppressed. Therefore, an excellent electric resistance welded tube can be obtained. Further, this makes it possible to reduce the weight and size of a heat exchanger and also cut costs.

DETAILED DESCRIPTION OF THE PREFERRED EMBODIMENTS

Figure 1:
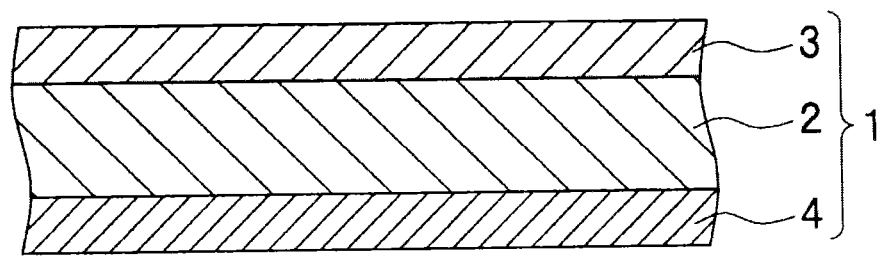
FIG. 1 is a cross-sectional view showing a configuration of an aluminum alloy brazing sheet for heat exchangers according to an embodiment of the present invention.

Hereinafter, the form of an aluminum alloy brazing sheet for heat exchangers according to an embodiment of the present invention will be described in detail with reference to the drawings. Incidentally, the size, positional relationship, and the like of the members shown in the drawings are sometimes exaggerated for a clear explanation.

<<Aluminum Alloy Brazing Sheet for Heat Exchangers>>

As shown in FIG. 1, an aluminum alloy brazing sheet 1 for heat exchangers (hereinafter sometimes referred to as a brazing sheet) according to an embodiment of the present invention includes a sacrificial material 3 on one side of a core 2 and a brazing filler metal 4 on the other side of the core 2. Further, the brazing sheet 1 has a work hardening exponent n of not less than 0.05, and the core 2 has an average crystal grain size of not more than 10 μm in a cross-section perpendicular to the rolling direction.

Hereinafter, each configuration will be described.

<Core>

The core 2 is an aluminum alloy containing Si: 0.1 to 1.0% by mass, Cu: 0.5 to 1.2% by mass, Mn: 0.5 to 2.0% by mass, and the balance of Al and unavoidable impurities. As optional components, the core 2 may further contain at least one member selected from Ti: 0.05 to 0.25% by mass, Cr: not more than 0.25% by mass, and Mg: 0.05 to 0.5% by mass.

[Si: 0.1 to 1.0% by Mass]

Si forms an intermetallic compound together with Al and Mn and is finely distributed in the crystal grains to contribute to dispersion strengthening, thereby improving strength after brazing. When the Si content is less than 0.1% by mass, strength after brazing decreases. Meanwhile, when the Si content is more than 1.0% by mass, the solidus temperature of the core 2 decreases. As a result, the core 2 melts during heating for brazing. Therefore, the Si content is specified to be 0.1 to 1.0% by mass. The content is preferably 0.2 to 0.4% by mass.

[Cu: 0.5 to 1.2% by Mass]

Cu is effective in improving strength after brazing. Further, the addition of Cu leads to a higher potential, increasing the potential difference from the sacrificial material 3. As a result, corrosion resistance is improved. When the Cu content is less than 0.5% by mass, strength after brazing decreases. In addition, the potential difference from the sacrificial material 3 cannot be ensured, whereby internal corrosion resistance decreases. Meanwhile, when the Cu content is more than 1.2% by mass, the solidus temperature of the core 2 decreases. As a result, the core 2 melts during heating for brazing. Therefore, the Cu content is specified to be 0.5 to 1.2% by mass. The content is preferably more than 0.7% by mass and not more than 1.1% by mass.

[Mn: 0.5 to 2.0% by Mass]

Mn is effective in improving strength after brazing. When the Mn content is less than 0.5% by mass, the number of intermetallic compounds formed between Al and Si decreases. As a result, the improvement of dispersion strengthening by an intermetallic compound is not achieved, and strength after brazing decreases. Meanwhile, when the content is more than 2.0% by mass, a large number of coarse intermetallic compounds are produced. As a result, rolling itself becomes difficult, making it difficult to produce the brazing sheet 1. Therefore, the Mn content is specified to be 0.5 to 2.0% by mass. The content is preferably 0.8 to 1.7% by mass.

[Ti: 0.05 to 0.25% by Mass]

Ti is distributed in the form of layers in the core 2 and greatly improves the corrosion resistance of the inner and outer surfaces. In the case where Ti is added, when the Ti content is less than 0.05% by mass, Ti is not distributed in the form of layers in the core 2. This results in pitting with significant corrosion, whereby corrosion resistance decreases. Meanwhile, when the content is more than 0.25% by mass, coarse intermetallic compounds are formed during casting, whereby corrosion resistance decreases. Therefore, in the case where Ti is added, the Ti content is specified to be 0.05 to 0.25% by mass. The content is preferably 0.1 to 0.20% by mass.

[Cr: Not More than 0.25% by Mass]

Cr forms an intermetallic compound in the core 2 and is effective in improving strength after brazing. When the Cr content is more than 0.25% by mass, coarse intermetallic compounds are formed during casting, whereby corrosion resistance decreases. Therefore, in the case where Cr is added, the Cr content is specified to be not more than 0.25% by mass. The content is preferably not more than 0.15% by mass.

[Mg: 0.05 to 0.5% by Mass]

Mg forms a fine $Mg_2Si$ precipitation phase together with Si and is effective in improving strength after brazing. When the Mg content is less than 0.05% by mass, strength after brazing decreases. Meanwhile, when the content is more than 0.5% by mass, in the case where brazing is performed using a non-corrosive flux, the flux reacts with Mg, making it impossible to perform brazing. Therefore, in the case where Mg is added, the Mg content is specified to be 0.05 to 0.5% by mass. The content is preferably 0.05 to 0.30% by mass.

[Balance: Al and Unavoidable Impurities

With respect to the components of the core 2 other than the above, the balance is Al and unavoidable impurities. Incidentally, examples of unavoidable impurities include Fe and Zr. They may be contained in the core 2 without interfering with the effect of the present invention as long as their contents are each not more than 0.2% by mass.

<Sacrificial Material>

The sacrificial material 3 is an aluminum alloy containing Si: more than 0.2% by mass and not more than 0.8% by mass, Zn: more than 2.0% by mass and not more than 5.0% by mass, Mg: 1.0 to 4.5% by mass, and the balance of Al and unavoidable impurities.

[Si: More than 0.2% by Mass and not More than 0.8% by Mass]

Si diffuses into the core 2 during brazing and is, together with Mg that diffuses from the sacrificial material 3 into the core 2, effective in precipitating $Mg_2Si$ in the core 2 after brazing and improving strength after brazing. When the Si content is not more than 0.2% by mass, it is less effective in precipitating $Mg_2Si$, and strength after brazing decreases. Meanwhile, when the content is more than 0.8% by mass, the solidus temperature decreases, whereby the sacrificial material 3 melts. Therefore, the Si content is specified to be more than 0.2% by mass and not more than 0.8% by mass. The content is preferably more than 0.2% by mass and not more than 0.6% by mass.

[Zn: More than 2.0% by Mass and not More than 5.0% by Mass]

Zn is an element that lowers the potential. The addition of Zn to the sacrificial material 3 is effective in ensuring a potential difference from the core 2 and improving internal corrosion resistance. A Zn content of not more than 2.0% by mass leads to a small potential difference from the core 2, which is insufficient for ensuring internal corrosion resistance. As a result, internal corrosion resistance decreases. Meanwhile, when the content is more than 5.0% by mass, the solidus temperature decreases. As a result, the sacrificial material 3 melts during brazing and becomes unusable as a tube material. Therefore, the Zn content is specified to be more than 2.0% by mass and not more than 5.0% by mass. The content is preferably more than 3.0% by mass and not more than 4.5% by mass.

[Mg: 1.0 to 4.5% by Mass]

Mg forms a fine $Mg_2Si$ precipitation phase together with Si and is effective in improving strength after brazing. When the Mg content is less than 1.0% by mass, it is less effective in precipitating $Mg_2Si$, and strength after brazing is not sufficiently improved. Meanwhile, when the content is more than 4.5% by mass, the rolling workability significantly deteriorates, making it difficult to produce the brazing sheet 1. Therefore, the Mg content is specified to be 1.0 to 4.5% by mass. The content is preferably 1.5 to 4.0% by mass.

[Balance: Al and Unavoidable Impurities]

With respect to the components of the sacrificial material 3 other than the above, the balance is Al and unavoidable impurities. Incidentally, examples of unavoidable impurities include Mn, Cr, Zr, Fe, In, and Sn. They may be contained in the sacrificial material without interfering with the effect of the present invention as long as the Mg content is less than 0.05% by mass, the Cr and Zr contents are each not more than 0.2% by mass, the Fe content is not more than 0.25% by mass, and the In and Sn contents are each not more than 0.1% by mass.

<Brazing Filler Metal>

The brazing filler metal 4 is made of an Al-based alloy. Examples of the Al-based alloy include ordinary JIS alloys such as 4343 and 4045. Here, Al-based alloys include alloys containing Si and also alloys containing Zn. That is, examples of the Al-based alloy include Al—Si-based alloys and Al—Si—Zn-based alloys. For example, it is possible to use an Al—Si-based alloy containing Si: 7 to 12% by mass.

When the Si content is less than 7% by mass, the amount of an Al—Si liquid phase at the brazing temperature is so small that brazeability is likely to deteriorate. Meanwhile, when the content is more than 12% by mass, the amount of coarse primary crystals Si increases during the casting of the brazing filler metal 4. As a result, when such a brazing filler metal is used in the brazing sheet 1, excessive melting is likely to occur at the interface between the core 2 and the brazing filler metal 4, whereby strength after brazing and corrosion resistance are likely to decrease.

However, the brazing filler metal 4 is not particularly limited and may be any of ordinary Al-based (Al—Si-based, Al—Si—Zn-based) alloys. In addition, Al—Si—Mg-based and Al—Si—Mg—Bi-based alloys that are used for vacuum brazing are also fully usable. Further, for example, in addition to Si, Zn, Mg, and Bi, Fe, Cu, Mn, and the like may also be contained.

<Work Hardening Exponent n: not Less than 0.05>

A work hardening exponent n is a property value that serves as an index of formability. It is known that when the work hardening exponent n is large, strain is easily transmitted, which leads to uniform deformation, resulting in improved elongation until local deformation (uniform elongation). However, it is known that the work hardening exponent of an aluminum alloy changes depending on the amount of strain and is likely to decrease especially in a high strain region (nominal strain: not less than 0.10).

Figure 2:
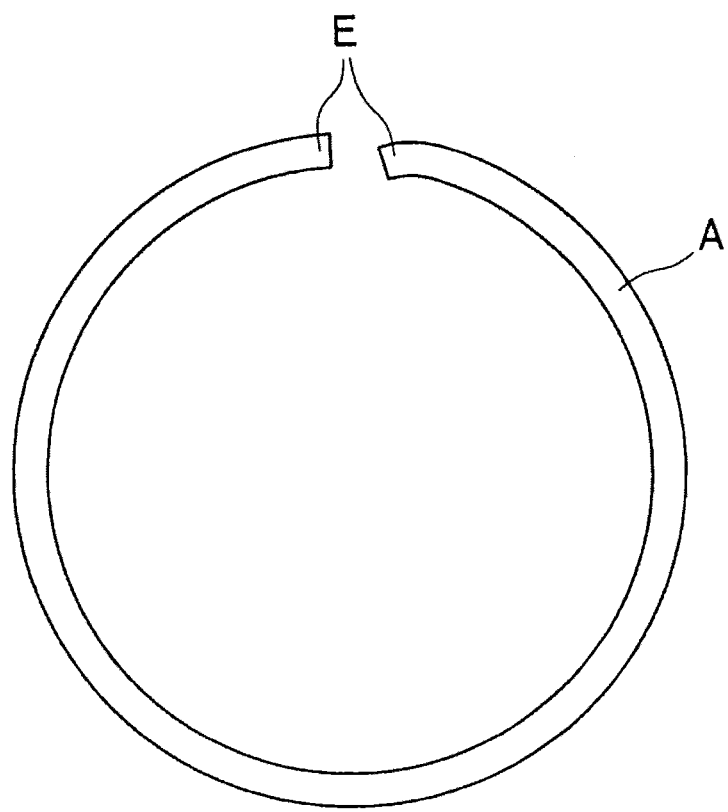
FIG. 2 is a cross-sectional view for explaining the buckling of an edge portion of a tube material.

In the present invention, it is important that the work hardening exponent n of the brazing sheet 1 before electric resistance welding is not less than 0.05. Extensive research has been conducted on an increase in weld defects during the electric resistance welding of a tube material accompanying thinning, and the process of the formation of an electric resistance welded tube has been fully examined. As a result, it has been found that as shown in FIG. 2, when weld defects occur, an edge portion E of a tube material A buckles during the formation of a diminishing pipe at about 2% strain by fin pass rolls. It has also been found that the work hardening exponent n greatly affects such buckling. In plastic working at about 2% strain by fin pass rolls, when the work hardening exponent n of the brazing sheet 1 is not less than 0.05, the inclination in the plastic working range is increased, leading to an increase in the critical value of strain at which buckling occurs. As a result, buckling caused by fin pass rolls can be suppressed, whereby matching during electric resistance welding is stabilized, making it possible to obtain an excellent thin electric resistance welded tube. Therefore, the work hardening exponent n of the brazing sheet 1 is specified to be not less than 0.05.

The work hardening exponent n can be calculated by a tensile test on a brazing sheet 1 processed into a test piece JIS No. 5 in accordance with the two-point method of JIS Z 2253 at 2% strain and 6% strain.

<Average Crystal Grain Size of Core in Cross-Section Perpendicular to Rolling Direction: not More than 10 µm>

With thinning and strengthening, cracking occurs at a welded portion during electric resistance welding. As a result of the full examination of such a welded portion with cracks, it has been found that the cracking occurs along the crystal grain boundary of the core 2 in the brazing sheet 1. As a result of extensive research, with respect to the cracking mentioned above, it has been found that when the grains are so fine that the crystal grain size of the core 2 in a cross-section perpendicular to the rolling direction is not more than 10 µm, the stress concentrated on the grain boundary in response to the deforming stress at a high temperature during electric resistance welding can be dispersed, and thus weld cracking does not occur even in the case of thinning and strengthening. Therefore, the average crystal grain size of the core 2 in a cross-section perpendicular to the rolling direction is specified to be not more than 10 µm. Incidentally, a core 2 crystal grain structure having no clear crystal grain boundary is a fine grain processing structure effective against weld cracking and is included in the crystal grain size of not more than 10 µm. Here, a cross-section of the core 2 perpendicular to the rolling direction means an ST (Short Transverse)-LT (Long Transverse) cross-section in the thickness direction. That is, it is a cross-section cut in the thickness direction (ST direction) along the width direction perpendicular to the rolling direction.

Next, the method for measuring the average crystal grain size of a core will be described.

A test material is cut into 2 cm×2 cm squares and embedded in a resin in the rolling direction, followed by polishing the cut section. Subsequently, the microstructure of the core 2 is observed under a microscope. The average crystal grain size of the core 2 in a cross-section perpendicular to the rolling direction is measured at three positions for each test material by a section method, and the average is determined.

Further, the work hardening exponent n and the average crystal grain size of the core 2 are controlled by the finish cold rolling reduction and the finish annealing conditions as described in the production method for the brazing sheet 1 below.

Such a brazing sheet can be produced by the following production method, for example.

First, an aluminum alloy for a core, an aluminum alloy for a sacrificial material, and an aluminum alloy for a brazing filler metal are melted by continuous casting and cast to produce an ingot. The ingot is subjected to surface-milling (a surface-smoothening treatment) and a homogenization heat treatment, thereby giving an ingot for a core (a member for a core), an ingot for a sacrificial material, and an ingot for a brazing filler metal. Then, the ingot for a sacrificial material and the ingot for a brazing filler metal are each hot-rolled to a predetermined thickness, thereby giving a member for a sacrificial material and a member for a brazing filler metal. Next, the member for a sacrificial material is laminated on one side of the member for a core, while the member for a brazing filler metal is laminated on the other side. The laminate is heat-treated (reheated) and then subjected to pressure bonding by hot rolling, thereby giving a plate material. Subsequently, cold rolling and intermediate annealing (continuous annealing) are performed, and further finish cold rolling is performed. Subsequently, finish annealing is performed. Alternatively, after the plate material is formed, only cold rolling is performed without performing intermediate annealing, and then finish annealing is performed.

Here, in order for the brazing sheet to have a work hardening exponent n of not less than 0.05 and also in order for the core to have an average crystal grain size of not more than 10 µm in a cross-section perpendicular to the rolling direction as mentioned above, it is necessary to control the finish cold rolling reduction and the finish annealing conditions in the production process. The conditions are different depending on whether intermediate annealing is performed. Hereinafter, the conditions will be described.

<With Intermediate Annealing>

In the case where intermediate annealing is performed during cold rolling, a continuous annealing furnace (CAL) is used, and the temperature (maximum attained temperature) is set at 350 to 550° C. When the maximum attained temperature during intermediate annealing is less than 350° C., the solution treatment is insufficient. Accordingly, even when the subsequent finish cold working and finish annealing temperature are controlled, an excessive amount of strain is introduced, which is likely to cause erosion during brazing, resulting in a decrease in erosion resistance. Meanwhile, in order to suppress the melting of the brazing filler metal during annealing, the upper limit of the temperature is not more than 550° C. Incidentally, in intermediate annealing using a continuous annealing furnace, the retention time at a temperature within a range of 350 to 550° C. is not particularly limited, but should usually be not more than 5 minutes (including "no retention").

The finish cold rolling reduction after intermediate annealing should be more than 80% and preferably not more than 90%. The strain introduced by finish cold rolling affects the softening behavior of the subsequent finish annealing, and, depending on the finish cold rolling reduction and the finish annealing conditions, it is difficult to obtain a work hardening exponent n of not less than 0.05 and a core average crystal grain size of not more than 10 µm in a cross-section perpendicular to the rolling direction. When the finish cold rolling reduction is not more than 80%, the average crystal grain size of the core in a cross-section perpendicular to the rolling direction is more than 10 µm. Meanwhile, when it is more than 90%, an excessive amount of strain is introduced, which is likely to cause erosion during brazing, possibly resulting in a decrease in erosion resistance. Incidentally, a higher finish cold rolling reduction leads to a smaller average crystal grain size and a larger work hardening exponent.

The finish annealing temperature after finish cold rolling is more than 250° C. and not more than 400° C. When the finish annealing temperature is not more than 250° C., it is not effective in relaxing the working strain during rolling, and the work hardening exponent n is less than 0.05. When the finish annealing temperature after finish cold rolling is more than 400° C., the core of the brazing sheet is recrystallized, and the average crystal grain size of the core in a cross-section perpendicular to the rolling direction is more than 10 µm. Incidentally, the heating time in finish annealing is not particularly limited, but it is usually preferable that the time is 1 to 10 hours. When the heating time is less than 1 hour, there is a possibility that the strength of the brazing sheet is not uniform over the entire coil. Meanwhile, when the time is more than 10 hours, the effect of softening annealing is saturated, which only undermines economic efficiency.

<Without Intermediate Annealing>

In the case where intermediate annealing is omitted, the cold working rate after hot rolling should be more than 80% and preferably not more than 97%. When the cold rolling ratio is not more than 80%, it is difficult to obtain a core average crystal grain size of not more than 10 µm in a cross-section perpendicular to the rolling direction. Meanwhile, when it is more than 97%, there is a possibility that the strength of the material is so high that it is difficult to roll the material to the desired thickness. In addition, the finish annealing conditions after finish cold rolling may also be the same as above. The conditions may include heating at a temperature of more than 250° C. and not more than 400° C. preferably for 1 to 10 hours. Incidentally, for the homogenization of the material structure, after hot rolling, it is possible to perform annealing at 350° C. or higher for 1 hour or longer, for example.

Examples

Next, the aluminum alloy brazing sheet for heat exchangers according to the present invention will be described in detail by way of a comparison between examples, where the requirements of the present invention are satisfied, and comparative examples, where the requirements of the present invention are not satisfied.

First, an aluminum alloy for a core, an aluminum alloy for a sacrificial material, and an aluminum alloy for a brazing filler metal were melted and cast in a usual manner, followed by a homogenization treatment, thereby giving an ingot for a core (a member for a core), an ingot for a sacrificial material, and an ingot for a brazing filler metal. The ingot for a sacrificial material and the ingot for a brazing filler metal were each hot-rolled to a predetermined thickness, thereby giving a member for a sacrificial material and a member for a brazing filler metal. Further, the member for a sacrificial material was laminated on one side of the member for a core, while the member for a brazing filler metal was laminated on the other side, in such a manner that the brazing filler metal clad ratio and the sacrificial material clad ratio were each 15%. The laminate was then subjected to pressure bonding by hot rolling to give a plate material. Subsequently, cold rolling, intermediate annealing (at a predetermined temperature for 1 minute), finish cold rolling, and finish annealing (at a predetermined temperature for 3 hours) were performed, or alternatively cold rolling and finish annealing (at a predetermined temperature for 3 hours) were performed, thereby giving a plate having a thickness of 0.25 mm.

The components of the core, the sacrificial material, and the brazing filler metal are shown in Tables 1 to 3. Incidentally, in Tables 1 and 2, components that are not contained are indicated with "—", and values that do not satisfy the configuration of the present invention are underlined.

TABLE 1

Core Composition

% by mass

|  | No. | Si | Cu | Mn | Cr | Ti | Mg | Fe | Remarks |
|---|---|---|---|---|---|---|---|---|---|
| Examples | S1 | 0.90 | 0.70 | 1.80 | — | — | — | — | |
|  | S2 | 1.00 | 0.50 | 1.80 | 0.15 | — | — | — | |
|  | S3 | 0.25 | 1.00 | 0.70 | 0.25 | — | — | — | |
|  | S4 | 0.30 | 1.00 | 0.70 | — | 0.05 | — | — | |
|  | S5 | 0.60 | 0.55 | 0.70 | — | 0.25 | — | — | |
|  | S6 | 0.70 | 1.00 | 2.00 | 0.05 | — | 0.05 | — | |
|  | S7 | 0.20 | 1.20 | 1.90 | — | — | 0.50 | — | |
|  | S8 | 0.85 | 0.85 | 1.80 | — | — | — | 0.20 | |
|  | S9 | 0.15 | 0.90 | 0.60 | 0.05 | — | — | 0.15 | |
|  | S10 | 0.10 | 0.75 | 0.60 | 0.20 | 0.10 | — | — | |
|  | S11 | 0.30 | 0.50 | 0.50 | — | 0.20 | 0.25 | — | |
|  | S12 | 0.25 | 0.90 | 1.20 | 0.05 | 0.10 | 0.15 | 0.10 | |
| Comparative | S13 | 0.05 | 0.60 | 1.50 | — | — | — | — | Too little Si |
| Examples | S14 | 1.05 | 0.50 | 1.00 | — | — | — | — | Too much Si |
|  | S15 | 0.50 | 0.45 | 1.00 | 0.10 | — | — | — | Too little Cu |
|  | S16 | 0.65 | 1.25 | 1.20 | — | 0.10 | — | — | Too much Cu |
|  | S17 | 0.65 | 0.65 | 0.45 | — | — | 0.20 | — | Too little Mn |
|  | S18 | 0.60 | 0.70 | 2.05 | — | — | — | 0.05 | Too much Mn |
|  | S19 | 0.60 | 0.75 | 1.20 | 0.30 | — | — | 0.05 | Too much Cr |
|  | S20 | 0.50 | 0.90 | 1.20 | 0.10 | 0.03 | — | — | Too little Ti |
|  | S21 | 0.50 | 0.65 | 1.50 | 0.20 | 0.27 | — | — | Too much Ti |
|  | S22 | 0.80 | 0.70 | 1.60 | — | 0.15 | 0.03 | — | Too little Mg |
|  | S23 | 0.50 | 0.60 | 1.60 | — | — | 0.55 | 0.15 | Too much Mg |

*Balance: Al and unavoidable impurities

TABLE 2

Sacrificial Material Composition

% by mass

|  | No. | Si | Zn | Mg | Remarks |
|---|---|---|---|---|---|
| Examples | G1 | 0.60 | 2.05 | 1.00 | |
|  | G2 | 0.50 | 2.05 | 1.00 | |
|  | G3 | 0.60 | 3.05 | 3.00 | |
|  | G4 | 0.30 | 3.05 | 3.00 | |
|  | G5 | 0.21 | 5.00 | 4.50 | |
|  | G6 | 0.80 | 4.50 | 4.50 | |
|  | G7 | 0.21 | 4.50 | 3.50 | |
| Comparative | G8 | 0.15 | 3.00 | 2.00 | Too little Si |
| Examples | G9 | 0.85 | 3.00 | 2.00 | Too much Si |
|  | G10 | 0.50 | 2.00 | 2.50 | Too little Zn |
|  | G11 | 0.50 | 5.10 | 3.50 | Too much Zn |
|  | G12 | 0.70 | 3.00 | 0.95 | Too little Mg |
|  | G13 | 0.60 | 3.00 | 4.60 | Too much Mg |

*Balance: Al and unavoidable impurities

TABLE 3

Brazing Filler Metal Composition

| No. | % by mass Si |
|---|---|
| R1 | 7.0 |
| R2 | 10.0 |
| R3 | 12.0 |

*Balance: Al and unavoidable impurities

With respect to the test material thus produced, the work hardening exponent n before electric resistance welding and the average crystal grain size of the core in a cross-section perpendicular to the rolling direction (hereinafter sometimes referred to as grain size of core material) were calculated, and the following tests were performed to evaluate the properties.

<Measurement of Work Hardening Exponent n>

A test material processed into a test piece JIS No. 5 was subjected to a tensile test, and the work hardening exponent n of the brazing sheet was calculated in accordance with the two-point method of JIS Z 2253 at 2% strain and 6% strain.

<Measurement of Grain Size of Core Material>

A test material was cut into 2 cm×2 cm squares and embedded in a resin in the rolling direction, followed by polishing the cut section. Subsequently, the microstructure of the core was observed under a microscope. The average crystal grain size of the core in the ST direction in a cross-section perpendicular to the rolling direction was measured at three positions for each test material by a section method, and the average was determined.

<Evaluation of High Frequency Welding Properties>

Using an ordinary slitter apparatus, the test material was slit into a bar having a width dimension of 35 mm and then wound up in the form of a coil. The bar thus obtained was processed into an electric resistance welded tube using an apparatus for producing an electric resistance welded tube, thereby giving a flat tube having a major-axis size of 16 mm and a minor-axis size of 2 mm. The flat tube was evaluated for weld cracking resistance and high frequency weldability.

[Weld Cracking Resistance]

The obtained flat tube was cross-sectionally observed to examine the presence or absence of weld cracks. In the case where no cracks were observed, weld cracking resistance was rated as excellent (◦). In the case where cracks were observed, weld cracking resistance was rated as poor (x).

[High Frequency Weldability]

A 100-m length of the obtained flat tube was visually examined to determine the presence or absence of a non-welded portion of 5 mm or longer in the longitudinal direction. In the case where a non-welded portion of 5 mm or longer was not seen, high frequency weldability was rated as excellent (◦). In the case where one or more non-welded portions of 5 mm or longer were seen, high frequency weldability was rated as poor (x).

<Evaluation of Strength after Brazing>

A test material was brazed using a drop test method (heating at a temperature of 600° C. for 5 minutes in a nitrogen atmosphere having a dew point of −40° C. and an oxygen concentration of not more than 200 ppm) and then processed into a test piece JIS No. 5 (three pieces were produced for each test material). The test pieces were allowed to stand at room temperature (25° C.) for one week and then measured for strength after brazing by a tensile test. When the average strength of the three test pieces after brazing was not less than 170 MPa, strength was rated as excellent (◦). When the average was less than 170 MPa, strength was rated as poor (x). Incidentally, the evaluation of strength after brazing was performed only on test materials rated as excellent (◦) in terms of high frequency welding properties.

<Evaluation of Erosion Resistance>

Test materials were cold-rolled at working rates of 10% and 20%, respectively, and they were brazed using a drop test method (heating at a temperature of 600° C. for 5 minutes in a nitrogen atmosphere having a dew point of −40° C. and an oxygen concentration of not more than 200 ppm). Subsequently, each test material was cut to 2 cm×2 cm squares and embedded in a resin, followed by polishing the cut section. Subsequently, the polished surface was observed under a microscope. In the case where not less than 60% of the core of each test material was robust, erosion resistance was rated as excellent (◦). In the case where the percentage was less than 60% in one or more of the test materials, erosion resistance was rated as poor (x). Incidentally, the evaluation of erosion resistance was performed only on test materials rated as excellent (◦) in terms of high frequency welding properties and strength after brazing.

<Evaluation of Brazeability>

Figure 3:
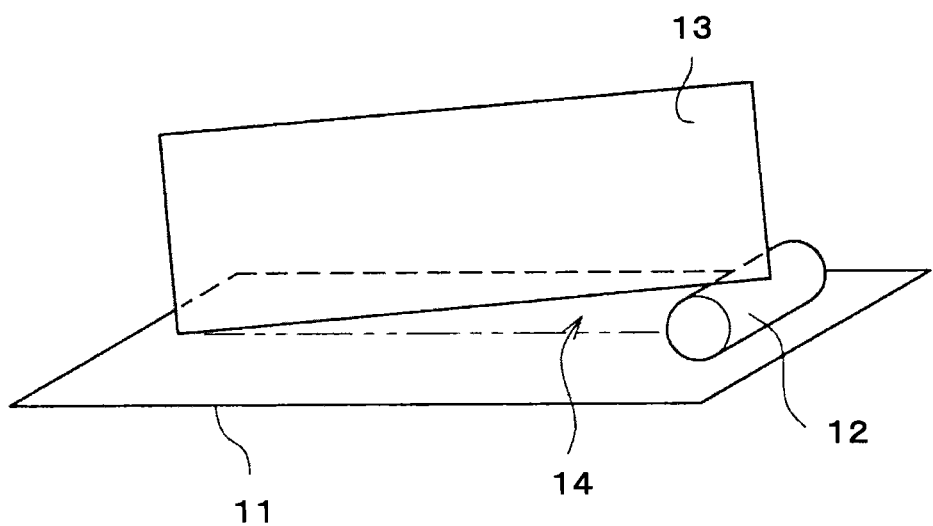
FIG. 3 is an explanatory view for explaining an evaluation test on brazeability in the examples.

A test piece with a size of 25 mm in width×60 mm in length was cut from a test material. To the brazing filler metal surface of the test piece, a non-corrosive flux FL-7 (manufactured by Morita Chemical Industries) was applied in an amount of 5 g/m² and dried. As shown in FIG. 3, the test piece (lower plate 11) was placed in such a manner that the brazing filler metal surface having the flux applied thereto faced up. Using a round bar of ϕ2 mm made of stainless steel as a spacer 12 thereon, a 3003 alloy plate (upper plate 13) 1 mm in thickness, 25 mm in width, and 55 mm in length was placed perpendicularly to the test piece and fixed with a wire. At this time, the position of the spacer 12 was 50 mm away from one end of the test piece. Brazing was then performed (heating at a temperature of 600° C. for 5 minutes in a nitrogen atmosphere having a dew point of −40° C. and an oxygen concentration of not more than 200 ppm). The length of the fillet filling the gap 14 between the test piece (lower plate 11) and the 3003 alloy plate (upper plate 13) was measured. When the fillet length was not less than 30 mm, brazeability was rated as excellent (◦). When the fillet length was less than 30 mm, brazeability was rated as poor (x). Incidentally, the evaluation of brazeability was performed only on test materials rated as excellent in terms of all of high frequency welding properties, strength after brazing, and erosion resistance.

<Evaluation of Corrosion Resistance>

A test material was brazed using a drop test method (heating at a temperature of 600° C. for 5 minutes in a nitrogen atmosphere having a dew point of −40° C. and an oxygen concentration of not more than 200 ppm) and then cut to a size of 50 mm in width×60 mm in length. Further, the brazing filler metal surface was entirely covered with a masking seal with a size of 60 mm in width×70 mm in length. In addition, the seal was folded back to the sacrificial-material-surface side such that the portion 5 mm from each edge of the sacrificial material was also covered with the seal. A test piece was thus produced.

The test piece was subjected to a corrosion resistance test including 90 cycles of the following procedure: the specimen is immersed in a test solution containing $Na^+$ 118 ppm, $Cl^-$: 58 ppm, $SO_4^{2-}$:60 ppm, $Cu^{2+}$:1 ppm, and $Fe^{3+}$:30 ppm (88° C.×8 hours), then naturally cooled to room temperature, and maintained at room temperature for 16 hours. The corrosion state was visually observed. When the maximum corrosion depth of the test piece was not more than 50 μm, corrosion resistance was rated as excellent (◦). When the maximum corrosion depth was more than 50 μm, corrosion resistance was rated as poor (x). Incidentally, the evaluation of corrosion resistance was performed only on test materials rated as excellent in terms of all of high frequency welding properties, strength after brazing, erosion resistance, and brazeablity.

The test results are shown in Tables 4 and 5. Incidentally, in Tables 4 and 5, test materials that were unevaluable or were not evaluated are indicated with "-", and the values of test materials which do not satisfy the configuration of the present invention or whose production conditions do not satisfy the requirements are underlined. In addition, with respect to grain size of core material, "no clear grain boundary" means a grain size of core material of not more than 10 μm.

TABLE 4

| No. | Sacrificial Material | Core | Brazing Filler Metal | Intermediate Annealing Temperature [° C.] | Finish Cold Rolling Cold Rolling Ratio [%] | Finish Annealing Temperature [° C.] | Grain Size of Core material [μm] | n value | High Frequency Welding Properties Cracking Resistance | High Frequency Weldability | Strength after Brazing | Erosion Resistance | Brazeability | Corrosion Resistance (Inner Side) |
|---|---|---|---|---|---|---|---|---|---|---|---|---|---|---|
| 1 | G1 | S1 | R1 | 450 | 81 | 400 | 8.1 | 0.21 | ○ | ○ | ○ | ○ | ○ | ○ |
| 2 | G1 | S2 | R1 | 450 | 81 | 400 | 6.1 | 0.20 | ○ | ○ | ○ | ○ | ○ | ○ |
| 3 | G1 | S3 | R1 | 450 | 85 | 255 | 6.1 | 0.06 | ○ | ○ | ○ | ○ | ○ | ○ |
| 4 | G1 | S4 | R1 | 450 | 85 | 255 | 7.1 | 0.05 | ○ | ○ | ○ | ○ | ○ | ○ |
| 5 | G1 | S5 | R1 | 450 | 85 | 300 | 6.6 | 0.10 | ○ | ○ | ○ | ○ | ○ | ○ |
| 6 | G1 | S6 | R1 | 450 | 85 | 300 | 7.8 | 0.09 | ○ | ○ | ○ | ○ | ○ | ○ |
| 7 | G1 | S7 | R1 | 450 | 85 | 300 | 7.6 | 0.12 | ○ | ○ | ○ | ○ | ○ | ○ |
| 8 | G1 | S8 | R1 | 450 | 85 | 300 | 5.6 | 0.11 | ○ | ○ | ○ | ○ | ○ | ○ |
| 9 | G1 | S9 | R1 | 450 | 85 | 255 | 6.1 | 0.07 | ○ | ○ | ○ | ○ | ○ | ○ |
| 10 | G1 | S10 | R1 | 450 | 85 | 255 | 7.1 | 0.06 | ○ | ○ | ○ | ○ | ○ | ○ |
| 11 | G1 | S11 | R1 | 450 | 85 | 300 | 6.6 | 0.10 | ○ | ○ | ○ | ○ | ○ | ○ |
| 12 | G1 | S12 | R1 | 450 | 85 | 300 | 7.8 | 0.10 | ○ | ○ | ○ | ○ | ○ | ○ |
| 13 | G1 | S1 | R1 | 350 | 95 | 300 | 6.3 | 0.09 | ○ | ○ | ○ | ○ | ○ | ○ |
| 14 | G2 | S1 | R1 | 550 | 95 | 300 | 4.3 | 0.12 | ○ | ○ | ○ | ○ | ○ | ○ |
| 15 | G3 | S1 | R1 | Not performed | 81 | 300 | No clear grain boundary | 0.15 | ○ | ○ | ○ | ○ | ○ | ○ |
| 16 | G4 | S1 | R1 | Not performed | 81 | 300 | No clear grain boundary | 0.16 | ○ | ○ | ○ | ○ | ○ | ○ |
| 17 | G5 | S1 | R1 | Not performed | 85 | 300 | No clear grain boundary | 0.16 | ○ | ○ | ○ | ○ | ○ | ○ |
| 18 | G6 | S1 | R1 | Not performed | 85 | 300 | No clear grain boundary | 0.15 | ○ | ○ | ○ | ○ | ○ | ○ |
| 19 | G7 | S1 | R1 | Not performed | 95 | 300 | No clear grain boundary | 0.14 | ○ | ○ | ○ | ○ | ○ | ○ |
| 20 | G1 | S1 | R1 | Not performed | 95 | 300 | No clear grain boundary | 0.14 | ○ | ○ | ○ | ○ | ○ | ○ |

TABLE 5

| No. | Sacrificial Material | Core | Brazing Filler Metal | Intermediate Annealing Temperature [° C.] | Finish Cold Rolling Cold Rolling Ratio [%] | Finish Annealing Temperature [° C.] | Grain Size of Core material [μm] | n value | High Frequency Welding Properties Cracking Resistance | High Frequency Weldability | Strength after Brazing | Erosion Resistance | Brazeability | Corrosion Resistance (Inner Side) |
|---|---|---|---|---|---|---|---|---|---|---|---|---|---|---|
| 21 | G1 | S13 | R1 | 450 | 85 | 300 | 7.6 | 0.12 | ○ | ○ | x | — | — | — |
| 22 | G1 | S14 | R1 | 450 | 85 | 300 | 5.6 | 0.13 | ○ | ○ | — | — | — | — |
| 23 | G1 | S15 | R1 | 450 | 85 | 300 | 6.1 | 0.12 | ○ | ○ | x | — | — | — |
| 24 | G1 | S16 | R1 | 450 | 85 | 300 | 7.1 | 0.11 | ○ | ○ | — | — | — | — |
| 25 | G1 | S17 | R1 | 450 | 85 | 300 | 6.6 | 0.11 | ○ | ○ | x | — | — | — |
| 26 | G1 | S18 | R1 | — | — | — | — | — | — | — | — | — | — | — |
| 27 | G1 | S19 | R1 | 450 | 85 | 300 | 7.6 | 0.13 | ○ | ○ | ○ | ○ | ○ | x |
| 28 | G1 | S20 | R1 | 450 | 85 | 300 | 5.6 | 0.12 | ○ | ○ | ○ | ○ | ○ | x |
| 29 | G1 | S21 | R1 | 450 | 85 | 300 | 6.1 | 0.13 | ○ | ○ | ○ | ○ | ○ | x |
| 30 | G1 | S22 | R1 | 450 | 85 | 300 | 7.1 | 0.12 | ○ | ○ | x | — | — | — |
| 31 | G1 | S23 | R1 | 450 | 85 | 300 | 6.6 | 0.11 | ○ | ○ | ○ | ○ | x | — |
| 32 | G8 | S1 | R1 | 450 | 85 | 300 | 7.8 | 0.11 | ○ | ○ | x | — | — | — |
| 33 | G9 | S1 | R1 | 450 | 85 | 300 | 7.6 | 0.10 | ○ | ○ | — | — | — | — |
| 34 | G10 | S1 | R1 | 450 | 85 | 300 | 5.6 | 0.13 | ○ | ○ | ○ | ○ | ○ | x |
| 35 | G11 | S1 | R1 | 450 | 85 | 300 | 6.1 | 0.12 | ○ | ○ | — | — | — | — |
| 36 | G12 | S1 | R2 | 450 | 85 | 300 | 7.1 | 0.13 | ○ | ○ | x | — | — | — |
| 37 | G13 | S1 | R3 | — | — | — | — | — | — | — | — | — | — | — |
| 38 | G1 | S1 | R1 | 560 | — | — | — | — | — | — | — | — | — | — |
| 39 | G1 | S1 | R1 | 450 | 79 | 300 | 10.4 | 0.10 | x | ○ | — | — | — | — |
| 40 | G1 | S1 | R1 | Not performed | 79 | 300 | 11.4 | 0.11 | x | ○ | — | — | — | — |
| 41 | G1 | S1 | R1 | 450 | 85 | 245 | 6.6 | 0.04 | ○ | x | — | — | — | — |
| 42 | G1 | S1 | R1 | 450 | 85 | 410 | 16.6 | 0.18 | x | ○ | — | — | — | — |

As shown in Table 4, test materials Nos. 1 to 20 satisfy the requirements of the present invention and thus were excellent for all the evaluation criteria.

Meanwhile, as shown in Table 5, Nos. 21 to 42 do not satisfy the configuration of the present invention, so the results were as follows.

In No. 21, the Si content of the core was too low, and thus the strength after brazing was poor. In No. 22, the Si content of the core was too high, and thus the core melted during heating for brazing. In No. 23, the Cu content of the core was too low, and thus the strength after brazing was poor. In No. 24, the Cu content of the core was too high, and thus the core melted during heating for brazing.

In No. 25, the Mn content of the core was too low, and thus the strength after brazing was poor. In No. 26, the Mn content of the core was too high, and thus rolling was not possible, making it impossible to produce a brazing sheet. In No. 27, the Cr content of the core was too high, and thus the corrosion resistance was poor. In No. 28, the Ti content of the core was too low, and thus the corrosion resistance was poor. In No. 29, the Ti content of the core was too high, and thus the corrosion resistance was poor. In No. 30, the Mg content of the core was too low, and thus the strength after brazing was poor. In No. 31, the Mg content of the core was too high, and thus the brazeability was poor.

In No. 32, the Si content of the sacrificial material was too low, and thus the strength after brazing was poor. In No. 33, the Si content of the sacrificial material was too high, and thus the sacrificial material melted during heating for brazing. In No. 34, the Zn content of the sacrificial material was too low, and thus the corrosion resistance was poor. In No. 35, the Zn content of the sacrificial material was too high, and thus the sacrificial material melted during heating for brazing. In No. 36, the Mg content of the sacrificial material was too low, and thus the strength after brazing was poor. In No. 37, the Mg content of the sacrificial material was too high, and thus rolling was not possible, making it impossible to produce a brazing sheet.

In No. 38, the temperature of intermediate annealing was high, and thus the brazing filler metal melted, making it impossible to produce a brazing sheet. In Nos. 39 and 40, the cold rolling ratio in finish cold rolling was low, and the core had a large crystal grain size; as a result, the cracking resistance was poor, leading to poor high frequency welding properties. In No. 41, the temperature of finish annealing was low, and the n value was too small; as a result, the high frequency weldability was poor, leading to poor high frequency welding properties. In No. 42, the finish annealing temperature was high, and the core had a large crystal grain size; as a result, the cracking resistance was poor, leading to poor high frequency welding properties.

Incidentally, the test material No. 40 assumes the brazing sheet of the prior technique described in JP-A-2001-170793 mentioned above. As this example shows, the brazing sheet of the prior technique does not satisfy the certain level in the above evaluations. Therefore, examples of the present invention objectively show that a brazing sheet according to the present invention is more excellent than a brazing sheet of the prior technique.

The present invention has been described in detail with reference to embodiments and examples. However, the gist of the present invention is not limited by the above descriptions, and the scope of the invention is to be understood based on the descriptions of the claims. Incidentally, needless to say, the present invention can be modified or varied, for example, based on the above descriptions.

What is claimed is:

1. An aluminum alloy brazing sheet for heat exchangers, comprising:
    a core consisting of a first aluminum alloy comprising: Al, Si: from 0.1 to 1.0% by mass, Cu: from 0.5 to 1.2% by mass, and Mn: from 0.5 to 2.0% by mass;
    a sacrificial material provided on one side of the core and made of a second aluminum alloy comprising: Al, Si: more than 0.2% by mass and not more than 0.8% by mass, Zn: more than 2.0% by mass and not more than 5.0% by mass, and Mg: from 1.0 to 4.5% by mass; and
    a brazing filler metal provided on the other side of the core and made of a third aluminum alloy,
    wherein
    the aluminum alloy brazing sheet has a work hardening exponent n of from 0.05 to 0.21, and
    the core has no clear crystal grain boundary.

2. The aluminum alloy brazing sheet for heat exchangers according to claim 1, wherein the core further comprises at least one selected from the group consisting of: Ti: from 0.05 to 0.25% by mass, Cr: not more than 0.25% by mass, and Mg: from 0.05 to 0.5% by mass.

3. The aluminum alloy brazing sheet for heat exchangers according to claim 1, wherein the aluminum alloy brazing sheet is obtained by a process comprising rolling the aluminum alloy brazing sheet in a finish cold rolling at a cold rolling ratio of more than 80% and not more than 97% without intermediate annealing.

* * * * *